United States Patent
Ellis et al.

(10) Patent No.: US 7,876,690 B1
(45) Date of Patent: Jan. 25, 2011

(54) DISTRIBUTED MEASUREMENT SYSTEM CONFIGURATOR TOOL

(75) Inventors: Stephen H. Ellis, Aberdeen, NJ (US); Sean Finn, Palo Alto, CA (US); Kanzhe Jiang, Mountain View, CA (US); Jose-Miguel Pulido, Barcelona (ES); Faisal Siddiqi, Santa Clara, CA (US)

(73) Assignee: Avaya Inc., Basking Ridge, NJ (US)

( * ) Notice: Subject to any disclaimer, the term of this patent is extended or adjusted under 35 U.S.C. 154(b) by 625 days.

(21) Appl. No.: 11/861,879

(22) Filed: Sep. 26, 2007

(51) Int. Cl.
H04L 12/26 (2006.01)

(52) U.S. Cl. .............. 370/241; 370/228; 370/229; 370/230; 370/236; 370/244; 370/250; 370/252; 370/254; 370/270; 455/226.1; 709/223

(58) Field of Classification Search ............ 370/228, 370/229, 230, 241, 244, 250, 252, 254, 270; 709/223; 455/226.1
See application file for complete search history.

(56) References Cited

U.S. PATENT DOCUMENTS

| | | | |
|---|---|---|---|
| 4,187,392 A | 2/1980 | Safford | |
| 5,271,000 A * | 12/1993 | Engbersen et al. | 370/244 |
| 5,448,639 A | 9/1995 | Arazi | |
| 5,610,951 A | 3/1997 | Higginson et al. | |
| 5,768,520 A * | 6/1998 | Dan et al. | 709/223 |
| 6,192,354 B1 | 2/2001 | Bigus et al. | |
| 6,483,811 B1 * | 11/2002 | Jabbarnezhad | 370/250 |
| 6,704,883 B1 | 3/2004 | Zhang et al. | |
| 6,934,934 B1 | 8/2005 | Osborne et al. | |
| 6,963,533 B2 * | 11/2005 | Kukic | 370/228 |
| 7,031,264 B2 | 4/2006 | Adhikari et al. | |
| 7,161,902 B2 * | 1/2007 | Carter et al. | 370/229 |
| 7,386,522 B1 | 6/2008 | Bigus et al. | |
| 2003/0084010 A1 | 5/2003 | Bigus et al. | |
| 2004/0010584 A1 | 1/2004 | Peterson et al. | |
| 2004/0057580 A1 | 3/2004 | Tie et al. | |
| 2004/0071085 A1 * | 4/2004 | Shaham et al. | 370/230 |
| 2004/0121749 A1 * | 6/2004 | Cui et al. | 455/226.1 |
| 2005/0068907 A1 * | 3/2005 | Garg et al. | 370/270 |

(Continued)

OTHER PUBLICATIONS

"Modular arithmetic" from Wikipedia, the free encyclopedia; http://en.wikipedia.org/wiki/Modular_arithmetic; printed Nov. 14, 2005; 4 pages.

(Continued)

*Primary Examiner*—William Trost, IV
*Assistant Examiner*—Toan D Nguyen
(74) *Attorney, Agent, or Firm*—Sheridan Ross P.C.

(57) ABSTRACT

A monitoring system gathers both site-to-site measurements, and agent-to-agent measurements, wherein one or more agents are distributed in one or more sites in a distributed network environment. Site-to-site measurements between two sites, such as site one and site two, are obtained by testing between any agent at site one and any agent at site two. A measurement rate between sites and between agents is determined that allows for the detection of events, such as user perceivable events, without overwhelming the set of agents that form the distributed measurement system. With, for example, a scheduling mechanism used to schedule measurement tests of finite duration, as opposed to continuous streams of measurement packets, for each pair of agents, the test can be used as an indication as to whether the measurement system is overwhelmed.

23 Claims, 10 Drawing Sheets

U.S. PATENT DOCUMENTS

2006/0050649 A1*  3/2006  Botton-Dascal et al. ..... 370/252
2007/0076605 A1*  4/2007  Cidon et al. ................ 370/230

OTHER PUBLICATIONS

"Modular Arithmetic"; http://www.cut-the-knot.org/blue/Modulo.shtml; printed Nov. 14, 2005; 4 pages.
"Primitive root modul n"; http://primitive-root-modulo-n.area51.ipupdatercom/; printed Nov. 14, 2005; 2 pages.
U.S. Appl. No. 11/459,834, filed May 25, 2006, Baldonado et al.
"Coprime" from Wikipedia, the free encyclopedia; http://en.wikipedia.org/wiki/Coprime; printed Nov. 14, 2005; 2 pages.
"Relatively Prime"; from Mathworld; http://mathworld.wolfram.com/RelativelyPrime.html; printed Nov. 14, 2005; 3 pages.
PlanetMath.org; definition of coprime; http://planetmath.org/encyclopedia/Coprime.html; printed Nov. 14, 2005; 1 page.
SebastiÁan Martín Ruiz; "Applications of Smarandache Function, and Prime and coprime Functions" Smaranda@teleline.es; www.terrra.es/personal/smaranda; American Research Press Rehoboth; 25 pages, Jun. 2002.
Paul Garrett; "Abstract Algebra: Lectures and Worked Examples for a Graduate Course"; July 8, 2005; http://www.math.umn.edu/~garrett/; 222 pages.

* cited by examiner

Fig. 4

| | | | |
|---|---|---|---|
| $T_{rtp-noloss}$ | Estimated RTP Test Duration with zero loss (ms) | 355 | (RTPpkts - 1) * RTPint + RTP_delay + Slop |
| $T_{ping-noloss}$ | Estimated PING Test Duration with no loss (ms) | 175 | (PINGpkts - 1) * PINGint + TWD + Slop |
| $R_{limit}$ | Slowest rate of rate-limited agents (tests/sec) | 0.90 | IP Phones conservative rate limit (tests/sec) |
| $Slop$ | Test Duration Increment for Host/Network Delays (ms) | 175 | Host/Network delay, than increase test time, aka "Slop" |
| $T_{rtp-maxloss}$ | Estimated RTP Test Duration w/all lost packets (ms) | 755 | (RTPpkts - 1) * RTPint + RTPto + Slop |
| $T_{ping-maxloss}$ | Estimated PING Test Duration w/all lost packets (ms) | 575 | (PINGpkts - 1) * PINGint + PINGto + Slop |
| $T_{rtp}$ | RTP Test Duration Used in Rate Calculations (ms) | 355 | Min(Trtp-exp, Trtp-max) |
| $T_{ping}$ | PING Test Duration Used in Rate Calculations (ms) | 175 | Min(Tping-exp, Tping-max) |
| $Z$ | Number of subzones in smallest tree branch | 4 | Reported by user in Cell C5 for flat or multi, 1 for NoZone |
| $M$ | Number of agents in subzone with fewest agents | 2 | M = min{Ni}, reported by user in Cell C6 |
| $T_{limit}$ | Test duration for deployments with IP Phones (sec) | 1.11 | 1/Rlimit (inverse of IP Phone Rate Limit) |
| $C$ | Number of cells in smallest tree branch | 16 | Z*2 for Flat or Multi, 1 for NoZone |
| $C_{cct}$ | Total Number of cells in the zone hierarchy | 16 | Reported by user in C9 for multi, Z*2 for Flat, 1 for No Zone |
| $R_{rtp-nolimit}$ | Rec. RTP rate with no IP Phones (tests/sec) | 22.53 | 1000 * M * [C / Z] * 1/Trtp |
| $R_{rtp-limit}$ | Rec. RTP rate with rate-limited IP Phones (tests/sec) | 7.2 | M * [C / Z] * 1/MAX(Tlimit, Trtp/1000) |
| $R_{ping-nolimit}$ | Rec. PING rate with no IP Phones (tests/sec) | 45.71 | 1000 * M * [C / Z] * 1/Tping |
| $R_{ping-limit}$ | Rec. PING rate with rate-limited IP Phones (tests/sec) | 7.2 | M * [C / Z] * 1/MAX(Tlimit, Tping/1000) |
| $R_{rtp-max}$ | "Best Case" Maximum RTP test rate (tests/sec) | 81.69 | 1000 * Nagts / Trtp |
| $R_{ping-max}$ | "Best Case" Maximum PING test rate (tests/sec) | 165.7 | 1000 * Nagts / Tping |
| $N_{agts}$ | Total Number of Active Agents | 29 | Reported by User in C8 for Flat or Multi, =C6 for NoZone |
| $OWD$ | Estimated One-Way Network Delay (ms) | 50 | One half of C49 |
| $TWD$ | Estimated Round-Trip Network Delay (ms) | 100 | Reported by User in Cell c23 |
| $P_{loss}$ | Estimated Network Loss Rate | 0% | Reported by User in Cell c24 |
| $T_{rtp-exp}$ | Expected RTP Test Duration (ms) | 355 | Trtp-noloss * (1 - Ploss) + Trtp-maxloss * Ploss |
| $T_{ping-exp}$ | Expected PING Test Duration (ms) | 175 | Tping-noloss * (1 - Ploss) + Tping-maxloss * Ploss |
| $RTP_{to}$ | RTP Timeout Value (ms) | 500 | Reported by User in Cell c16 |
| $PING_{to}$ | PING Timeout Value (ms) | 500 | Reported by User in Cell c19 |
| $R_{rtp}$ | Recommended RTP Test Rate (tests/sec) | 3.6 | Reff * Prtp |
| $R_{ping}$ | Recommended PING Test Rate (tests/sec) | 3.6 | Reff * (1 - Prtp) |

*Fig. 5*

| Symbol | Description | Value | Notes |
|---|---|---|---|
| $N_{limit}$ | IP Phone CNA Agents? (Yes = 1, No = 0) | 1 | Reported by User in Cell c11 |
| $RTP_{pkts}$ | RTP Test Number of Packets | 10 | Reported by User in Cell c14 |
| $PING_{pkts}$ | PING Test Number of Packets | 1 | Reported by User in Cell c17 |
| $RTP_{int}$ | RTP Test Interval Between Packets | 20 | Reported by User in Cell c15 |
| $PING_{int}$ | PING Test Interval Between Packets | 50 | Reported by User in Cell c18 |
| $RTP_{delay}$ | Network Delay Added to RTP Test Duration | 100 | IF Nlimit = 0, $RTP_{delay}$=OWD, else $RTP_{delay}$=TWD |
| $P_{rtp}$ | Proportion of Tests Running that are RTP | 0.5 | Determined from OptionButton1 value (initialized to "joint") |
| $T_{eff}$ | Effective Test Duration of Joint RTP and PING Tests | 265.0 | Trtp * Prtp + Tping * (1-Prtp) |
| $R_{eff-nolimit}$ | Effective Joint rate with no IP Phones (tests/sec) | 30.2 | 1000 * M * [C / Z] * 1/Teff |
| $R_{eff-limit}$ | Effective Joint rate with IP Phones (tests/sec) | 7.2 | M * [C / Z] * 1/MAX(Tlimit,Teff/1000) |
| $R_{eff-max}$ | Theoretical Maximum Effective Test Rate (tests/sec) | 109.4 | N / Teff |
| $R_{eff}$ | Effective Joint Test Rate Based on Teff (tests/sec) | 7.2 | MIN{IF[Nlimit>0,Reff-limit,Reff-nolimit],Reff-max} |
| $AVG_{agts}$ | Average number of CNA Agents per Zone | 7.3 | Nagts / SQRT(Ctot) |
| $N_{svrs}$ | Number of Servers in Hive | 1 | Reported by User in Cell C4 |
| $R_{rtp-orig}$ | RTP rec rate before 2 new limits applied | 3.000 | =C55 (Reff * Prtp) truncated if > 1 |
| $R_{ping-orig}$ | PING rec rate before 2 new limits applied | 3.000 | =C56 (Reff * (1 - Prtp)) truncated if > 1 |
| PSRL | Per-Server Rate Limit for the Hive for each test type | 49.0 | Nsvrs * 49 |
| KQRL | Key-Queue Rate Limit for the Hive for each test type | 301.000 | 5 * C * 1/Teff * 1000 |
| $MIN_{psrl-kqrl}$ | Minimum of Per-Server and Key Queue Rates | 49.000 | Min(PSRL, KQRL) |
| $R_{rtp-new}$ | New RTP rate limit with 2 new limits applied | 3.000 | Min(Rrtp,min(PSRL,KQRL)) |
| $R_{ping-new}$ | New Ping rate limit with 2 new limits applied | 3.000 | Min(Rping,min(PSRL,KQRL)) |
| ZHType | Zone Hierarchy Type (1=Flat, 2=Multi, 3=None) | 1 | Tracks value of ZHType variable in VB code |

| | A | B | C | D | E | F | G | H | I |
|---|---|---|---|---|---|---|---|---|---|
| 1 | | Enter Information About the Deployment | | | Recommended Test Rates | | | | |
| 2 | | Entries in these fields are mandatory | | | Which tests are you running? | ○ RTP and PING | ○ RTP Only | ○ PING Only | |
| 3 | | 1. What is the form of the Chatter Zone Hierarchy? ○ Flat ○ Multi-Level ○ None | MULTI | | Recommended Maximum Chatter Test Rates | RTP | RTP | PING | PING |
| 4 | | 2. Enter the number of CNA SERVERS in the Hive. | 3 | | | | | | |
| 5 | | 3. Enter the NUMBER OF ZONES IN THE BRANCH OF THE ZONE TREE WITH THE FEWEST DIRECT (SUB)ZONES (see Instructions Worksheet). | 6 | | RTP & PING Maximum Recommended Rates (tests/sec)* | 8.000 | 8.000 | 8.000 | |
| 6 | | 4. In the branch of the Zone Tree with the fewest direct (Sub)Zones, identify the 'Leaf' Zone with the fewest agents, and ENTER THE NUMBER OF CNA AGENTS IN THAT ZONE. | 3 | | TRACEROUTE Maximum Recommended Rate | | 6 per-sec | | |
| 7 | | | | | | | | | |
| 8 | | 5. Enter the TOTAL NUMBER OF 'ACTIVATED' CNA AGENTS IN THE HIVE (this value is reported in the output of 'show cna-agent'). | 73 | | *Note: Multiply fractional test rates under 1 test/sec by 60 to convert to tests/min; e.g., 0.5 tests/sec = 30 tests/min | | | | |
| 9 | | 6. Enter the TOTAL NUMBER OF CELLS produced by the Zone Tree (this value is reported in the output of 'show stat chatter cell' as the 'Total Bivariate Cells'). | 102 | | Expected System Performance with these Rates | | | | |
| 10 | | 7. Are there any IP PHONE CNA AGENTS? ○ Yes ○ No | YES | | Expected Time to alarm a Zone on DELAY or JITTER (sec) | 63.8 | 63.8 | 38.3 | 38.3 |
| 11 | | Change the following fields only if the chatter default values have been changed in the CLI | | | Average Cell Inter-Measurement Time [IAT] (sec) | 12.8 | 12.8 | 12.8 | 12.8 |
| 12 | | | | | Expected Time to declare a Subnet-Pair outage (sec) | 666.1 | 666.1 | 1998.4 | |
| 13 | | | | | Average Subnet-Pair Inter-Measurement Time [IMT] (sec) | 666.1 | 666.1 | 666.1 | |
| 14 | | RTP Test Number-of-Packets | 50 | | | | | | |
| 15 | | RTP Test Interval-Between-Packets (msec) | 20 | | Assess the Impact of different test rates on subnet-pair measurements | RTP | RTP | PING | PING |
| 16 | | RTP Test Timeout Parameter (msec) | 500 | | | | | | |
| 17 | | PING Test Number-of-Packets | 1 | | | | | | |
| 18 | | PING Test Interval-Between-Packets (msec) | 50 | | Enter new rate: | 4.000 | 4.000 | 4.000 | |
| 19 | | PING Test Timeout Parameter (msec) | 500 | | Expected time to declare a subnet-pair outage (sec) | 1332.3 | 1332.3 | 3996.8 | |
| 20 | | Strikes Needed to Raise an Alarm (Alarm-Threshold-Exceeded) | 5 | | Average subnet-pair inter-measurement time [IMT] (sec) | 1332.3 | 1332.3 | 1332.3 | |
| 21 | | Consecutive # of Losses Before Declaring an Outage (engine) | 3 | | | | | | |
| 22 | | Change these fields if needed based on the customer's network | | | Reset Input Fields | | | | |
| 23 | | What is the typical round-trip delay for IP traffic on the customer's network? (msec) | 100 | | | | | | |
| 24 | | What is the typical loss rate for IP traffic on the network? (percent) | 1% | | | | | | |

DISTRIBUTED MEASUREMENT SYSTEM CONFIGURATOR TOOL

FIELD OF THE INVENTION

Exemplary embodiments of the present invention are directed toward communications systems. More specifically, an exemplary embodiment is directed toward performance management and measurement in a distributed network environment.

BACKGROUND OF THE INVENTION

Communications over a WAN are becoming increasingly critical for corporations and other entities, particularly for real-time communications over a WAN such as voice over IP (VoIP), video over IP, and session establishment via SIP. Applications such as these and other WAN applications pose new challenges for WAN performance monitoring systems.

In conventional corporate WAN architectures, such as hub-and-spoke, the number of paths to measure increases linearly as new sites are added. In addition to these traditional architectures, where remote and branch sites mostly communicate with regional and headquarter sites, traffic from direct VoIP communications between remote sites is becoming an increasingly important component of the overall traffic. In this case, the number of paths to measure increases geometrically with the addition of new sites.

Additionally, VoIP users are not willing to tolerate performance degradation in the bearer traffic such as a few seconds of "dead air" in a live conversation.

SUMMARY OF THE INVENTION

In general, since the number of paths to measure or test increases geometrically in a distributed network environment, and users are increasingly unwilling to tolerate performance degradation, especially in VoIP conversations, a measurement rate high enough to detect user-perceivable performance degradation events is necessary.

These conditions suggest the need for a distributed measurement system that covers all paths of interest and a measurement rate at a high enough frequency to detect the network events of interest. Specifically, for critical applications such as VoIP or video over IP, which can be degraded to the point where they are no longer acceptable when performance problems occur in a customer network, every reduction in the time required to detect problems can have tangible value to an end user.

In accordance with an exemplary embodiment, the techniques disclosed herein determine an active measurement rate that produces, for example, the fastest possible time to detect a problem for any distributed measurement system using active probes distributed throughout the network, based on a small number of parameters that are, for example, specified by a user.

Most measurement systems today focus either on detecting user-perceivable performance degradation events by using a high enough measurement rate over a limited set of paths, or on monitoring the long term performance of the entire network, by using low measurement rate over a much larger number of paths, but not both.

It is difficult to measure both simultaneously because an optimum maximum achievable measurement rate in a distributed measurement system is difficult to determine due to the large number of variables involved. These variables include the number and capabilities of the measurement agents, the number of sites to measure, the assignment of measurement agents to sites, the duration and pattern of measurement tests, and the like. Moreover, the tight interrelationship among all these variables requires the variables to be considered as a whole. If all the variables are not considered together, a change in a single variable when the system is configured to run close to its maximum supported rate may lead to overwhelming the entire distributed measurement system.

Historically, measurement rates are usually configured in a conservative manner, far from their maximum attainable values, to prevent the collapse of the measurement system. This conservative configuration impacts the ability to detect relevant events, especially those "dead air" situations that last just a few seconds, but are long enough to frustrate, for example, VoIP users.

In accordance with an exemplary embodiment, a monitoring system is presented that gathers both site-to-site measurements, and agent-to-agent measurements, wherein one or more agents are distributed in one or more sites in a distributed network environment. Site-to-site measurements between two sites, such as site one and site two, are obtained by testing between any agent at site one and any agent at site two. One exemplary aspect of the techniques disclosed herein is to determine a measurement rate between sites and between agents that allows for the detection of events without overwhelming the set of agents that form the distributed measurement system. With, for example, a scheduling mechanism used to schedule measurement tests of finite duration, as opposed to continuous streams of measurement packets, for each pair of agents, the test to operate can be used as an indication as to whether the measurement system is overwhelmed.

In accordance with an exemplary embodiment, the rate determination module determines an aggregate rate, i.e., the rate value at which a distributed measurement system is scheduling tests. Thus, the rate of tests for a given agent, or site, should be smaller than the computed aggregated rate. This measurement rate configuration tool can be used in conjunction with any scheduling mechanism used to schedule measurement test(s) at the rate specified by the tool.

An exemplary aspect of the present invention is directed toward distributed measurement techniques.

Further aspects of the invention are directed toward acquiring information from one or more of site-to-site measurements and agent-to-agent measurements.

Additional aspects of the invention are directed toward determining a measurement rate between sites and between agents without overwhelming the set of agents that form a distributed measurement system.

Additional aspects of the invention relate to a tool utilized to maximize the measurement rate between sites and between agents without overwhelming the set of agents that form the distributed measurement system.

Aspects of the invention further relate to a scheduling module utilized to schedule measurement tests of a finite duration for each pair of agents in a distributed measurement system, wherein the test drop rate can be used as an indication of whether the system is overwhelmed.

Aspects of the invention further relate to a user interface utilized for configuring and determining a measurement rate between one or more of sites and agents.

These and other features and advantages will be apparent from the disclosure herein. The described embodiments and configurations are neither complete nor exhaustive. As will be appreciated, other embodiments of the invention are possible utilizing, alone or in combination, one or more features as set forth above or described in detail below.

BRIEF DESCRIPTION OF THE DRAWINGS

Exemplary embodiments of the invention will be described in detail, with reference to the following figures wherein:

FIG. 4 illustrates an exemplary user interface for a configuration tool according to this invention;

FIGS. 5-6 illustrate the various constraints and formulas for the configuration tool according to this invention;

FIG. 7 illustrates an exemplary populated interface of the configuration tool according to this invention.

DETAILED DESCRIPTION

Figure 1:
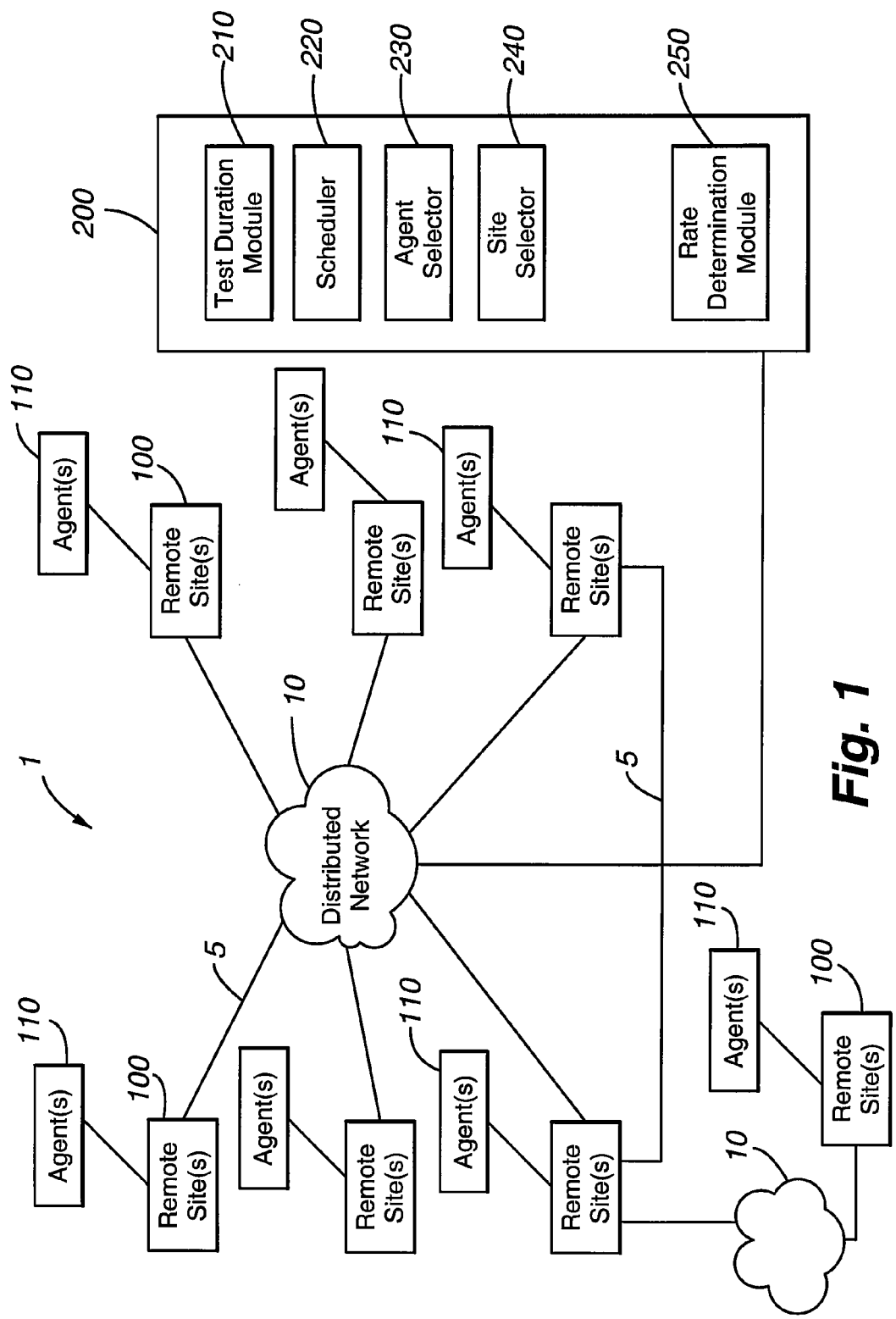
FIG. 1 illustrates an exemplary distributed network according to this invention.

The exemplary embodiments of this invention will be described in relation to distributed networks, and testing distributed networks. However, it should be appreciated that in general, the systems, methods and techniques of this invention will work well for any type of communication network or environment.

The exemplary systems, methods and techniques of this invention will also be described in relation to telecommunications systems, and associated telecommunications hardware, software and/or communication channels. However, to avoid unnecessarily obscuring the present invention, the following description omits well-known structures, network components and devices that maybe shown in block diagram foam, are well known, or are otherwise summarized.

For purposes of explanation, numerous details are set forth in order to provide a thorough understanding of the present invention. It should be appreciated however, that the present invention may be practiced in a variety of ways beyond the specific details as set forth herein.

Furthermore, while the exemplary embodiments illustrated herein show various components of the system collocated, it is to be appreciated that the various components of the system can be located at distant portions of a distributed network, such as a telecommunications network and/or the Internet, or within a dedicated secure, unsecured, and/or encrypted system. Thus, it should be appreciated that the components of the system can be combined into one or more devices, such as a PBX or communications device, or the like, or collocated on a particular node of a distributed network, such as an analog and/or digital telecommunications network, a circuit-switched network and/or a packet-switched network. As will be appreciated from the following description and for reasons of computational efficiency, the components of the system can be arranged at any location within a distributed network without affecting the operation of the system. For example, the various components can be located within a PBX, at one or more users' premise, in a dedicated testing module, or some combination thereof.

Similarly, one or more functional portions of the system could be distributed between a telecommunications device(s) and an associated computing device.

It should also be appreciated that various links, including any communications channels and the various links 5, connecting the elements, can be wired or wireless links, or any combination thereof, or any other well-known or later developed element(s) that is capable of supplying and/or communicating data to and from the connected elements. The term module as used herein can refer to any known or later developed hardware, software, firmware, fuzzy logic, expert system, neural network or combination thereof that is capable of performing the functionality associated with that element. The terms determined, calculate and compute and variations thereof, as used herein are interchangeable and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been discussed and illustrated in relation to a particular sequence of events, it should be appreciated that changes, additions, and omissions to this sequence can occur without materially affecting the operation of the invention.

As will be appreciated, the communication system 1 can also comprise other well known components which will not be described herein in detail. For example, the communication system 1 can further include one or more telephony switches/media servers that can be of any architecture for directing communications to one or more communications devices, remote site and/or agents. The network(s) 10 can typically include proxies, registers, switches and routers that are well known.

The exemplary communications system 1 comprises one or more remote sites 100 and one or more associated agents 110. The communications system 1 further comprises a distributed network analysis module 200 that in turn includes a test duration module 210, a scheduler 220, an agent selector 230, a site selector 240 and a rate determination module 250, which can be connected via the distributed network and communication links 5 to one or more remote sites and agents.

An exemplary aspect of the invention utilizes the one or more distributed agents in conjunction with the distributed network analysis module 200 to determine a maximum achievable/optimal measurement rate in the distributed network environment, and thus reduces the amount of time to detect performance degradation events over the paths of interest. The measurement rate determined by the technique, which can then be implemented by a user on a distributed measurement system, is considered optimal because rates lower than the determined rate do not utilize the distributed network probes or agents to their fullest capacity, while rates higher than the determined rate over utilize the distributed network agents beyond their full capacity, causing them to "drop" or fail to respond to subsequent tests offered to them. As the number of dropped tests increases, the efficiency of the distributed measurement system decreases, to the point where the effective test rate drops below the determined rate.

Thus, there is a two step process for implementing the exemplary techniques according to this invention. The first step is to determine the rate and test duration, and then schedule the test based on this determination.

Rate and Test Duration:

1. Maximum Absolute Rate

N/test_duration

Where N is the total # of agents in the system

This is the maximum test duration that occurs when all agents are active at the same time performing one test. If agents are able to initiate more than one test at a time, that maximum rate would increase appropriately. For ease of the discussion we assume that an agent can only originate one test at a time, however, it is to be appreciated that an agent can be running multiple tests in parallel.

2. The Test Duration Depends on:
(1) number of packets in test
(2) the interval between test packets
(3) if there is packet loss; and
(4) the average delay.

The last two factors make the determination of the test duration deployment-specific. The range of test duration can be determined when considering the case when there is no loss at all, and when the last packet of the test is lost:

$$T\text{no-loss}: (\text{num\_packets}-1)*\text{interval\_between\_packets}+\text{delay}$$

$$T\text{max-loss}: (\text{num\_packets}-1)*\text{interval\_between\_packets}+\text{packet\_timeout}$$

In the presence of loss, the duration of the test would be determined by the lost packet with the highest ID in the salvo (THE SET OF CONSECUTIVE PACKETS THAT FORM A TEST), i.e., the later the loss occurs in the salvo, the larger the test duration. To avoid being dependent on loss ordering, the determination can be simplified by assuming that if loss strikes, it should be as if the last packet in the salvo is lost (worst case analysis). Therefore, what remains is either Tmax-loss if there is loss, and Tno-loss if there is no loss. Given that loss is a probabilistic event, the test duration can be modeled as a Bernoulli random variable, with probability of loss p. The expected value for the test duration becomes:

$$T\text{no-loss}*(1-p)+T\text{max-loss}*p$$

where P is estimated per deployment.

The assumption is that each measurement packet in the test is transmitted once. If packets were allowed to be retransmitted, the maximum delay in the presence of loss would become:

$$T\text{max-loss}: (\text{num\_packets}-1)*\text{interval\_between\_packets}+\text{packet\_timeout}*r$$

where r is the number of retransmissions allowed per packet

3. Optimal Rate

In order to determine the maximum optimal rate that can be achieved without significant test drop rates, a given agent should finish an ongoing test before it receives a new test request. In other words, that, on average, the amount of time between consecutive tests for a given agent should be equal or larger than the test duration.

For the rest of the discussion we are going to assume the use of a scheduling mechanism that schedules tests at two levels: at the first level it selects the pair of sites to test, and at a second level, it selects the agent pair that is going to carry the test, with one agent pertaining to one site, and the other agent pertaining to the other site. It is also assumed that the determined maximum rate corresponds to the rate of tests between sites. The analysis should be valid for other types of scheduling mechanisms as long as the goal of ensuring that the amount of time between consecutive tests for a given agent should be equal or larger than the test duration holds.

Assume each site can communicate with each other site, and assume that the scheduler is able to maximize the "spread" between site pairs containing the same site, i.e., that it maximizes the number of site pairs selected between site pairs containing the same site. Then, if there are C site-pairs and Z sites, a given site participates in (2Z−1) site pairs. In order to maximize the spread, that means a site is selected every C/(2Z−1) site pairs.

In practice, there is no scheduling mechanism that can achieve the ideal spread because eventually there are not enough site-pair "slots" to satisfy everybody. How to address this limitation is algorithm specific, but a fair scheduling algorithm in a distributed measurement system can approximate the spread through randomness, and all the site pairs can be scheduled in advance.

Therefore, to the extent possible a site is selected every C/(2Z−1) site pairs. If the site has Ni agents, the probability of selecting an agent is 1/Ni, which means that, on average, every agent in the site will be selected every Ni*C/(2Z−1) site pairs.

In general, once selected, the agent should be able to have finished a previous test before it is selected again, i.e.:

$$Ni*C/(2Z-1)*1/R > \text{test\_duration}$$

where R is the target rate, and thus 1/R is the scheduling interval, and test_duration is the value computed in step #2

A bound for the rate is found in accordance with:

$$R < Ni*C/(2Z-1)*1/\text{test\_duration}$$

Now, an agent can be selected as either master or slave, i.e., to originate the test, or to receive the test, respectively.

Depending on if the agents are multithreaded or not, i.e., if they can carry more than one test at a time, this rate can be adjusted. For example, if an agent can only carry one test as a master, but can carry multiple tests as slave, then one can focus on the master selection.

Therefore, if an agent is selected every NiC/(2Z−1) site pairs, we can assume that half of the time (or, for half of those site pairs), it is picked as a master, and the other half as a slave. If so, an agent would be selected as master every NiC/Z site pairs (Z, and not Z−1 because we want to account for the "intra-site" selection). As above, an agent should finish as a master before it is scheduled to be a master again, i.e.:

$$Ni*C/Z*1/R > \text{test\_duration}$$

And thus:

$$R < Ni*C/Z*1/\text{test\_duration}$$

for Ni, min{Ni} is used, i.e., the minimum # of agents on any given site:

$$R < \min\{Ni\}*C/Z*\text{test\_duration}$$

for the same # of agents per site:

$$Ni=N/Z$$

and given that C=Z^2:

$$R < N*1/\text{test\_duration}$$

R, the recommended rate, and should also be bounded by the absolute maximum rate, as described in section #1. And that absolute maximum rate can be achieved, in theory, when all sites have the same number of agents.

In accordance with the above example, on average, every agent in a site will be selected every Ni*C/Z site pairs as a master. And, to avoid test drops, the agent should be able to have finished before it is selected again as a master, i.e.:

$$Ni*C/Z*1/R > \text{test\_duration} \quad (1)$$

and the max rate is then:

$$R < Ni*C/Z*1/\text{test\_duration} \quad (2)$$

Now, if a master can support k simultaneous tests, that means k tests can be started in the period of time (Ni*C/Z*1/R), and not just one. The idea is that a master can have k tests running at the same time, and that before adding a new one, any of the previous ones should end (usually the oldest one), to avoid having k+1 ongoing tests. This can be accomplished by continuing to use the approximation of an ideal scheduler that achieves "maximum site spread", i.e., that the number of site pairs in between site pairs containing the same subnet is maximized. If so, the maximum rate with a multitasking master can, on average, be k times higher than the unitask master:

$$R(\text{multitask})=k*R(\text{unitask})<k*Ni*C/Z*1/\text{test\_duration} \qquad (3)$$

Note also that there is an underlying assumption that there is no limit on the number of simultaneous tests that a slave can support. This assumption is present throughout the description herein.

4. Rate Limited Agents

There may be cases where agents are rate limited in terms of the maximum number of tests that they can carry over a period of time. For those cases, all the formulas above apply, with the only difference that the test duration should be modified to:

$$\text{Max}(\text{test\_duration}, 1/\text{rate\_limit})$$

If there is any rate limited agent, a rate limited duration should be used.

5. Subnet Pair Inter-Measurement Time (IMT)

Once the target rate has been determined, the actual site pair rate and agent pair rate is dependent on the scheduling algorithm that tries to meet that rate. For instance, round-robin scheduling traverses the list of site pairs and agent pairs always in the same order. In contrast, fair scheduling traverses the list of subnet pairs and agent pairs in a random fashion while maintaining a bound in the time between consecutive tests for a given pair.

In a particular embodiment of the invention, it is assumed that the fair scheduling algorithm is used for both site pairs, and for agent pairs within a given site pair. In this case:

The IMT range of a given site pair is:

$$\text{Site\_pair\_IMT: }[1/R, 2C/R]$$

where R is the configured test rate, and C is the number of site pairs. Given the range can be interpreted as a uniform r.v., the average IMT is C/R.

The IMT range for a given agent pair is in the range of $$\text{agent\_pair\_IMT: }[\text{site\_pair\_IMT}, 2*Mi*Mj \text{ site\_pair\_IMT}]$$

where Mi is the number of agents in one site, Mj the number of agents in the other site, and site_pair_IMT is determined above.

The agent pair IMT range becomes:

$$\text{Agent\_pair\_IMT: }[1/R, 4*Mi*Mj*C/R]$$

where Mi and Mj are the # of agents in each of the sites of the site pair, respectively.

On average, the agent_pair_IMT is $2*Mi*Mj*C/R$.

When all sites have the same # of agents M, agent_pair_IMT becomes:

$$M=N/Z$$

$$C=Z^2$$

$$\text{Avg\_agent\_pair\_IMT}=2*N^2/R$$

In addition, assuming each agent pair generates a separate subnet pair, the subnet pair IMT is the same as the agent pair IMT:

$$\text{Avg\_subnet\_pair\_IMT}=2*Mi*Mj*C/R$$

Note this is a worst case analysis. If more than one agent pair classifies into the same subnet pair, the IMT could be lower.

In order to make the subnet pair/agent pair IMT computation independent from Mi, Mj, the average number of agents per site can be used, N/Z. Note that the average should be used, and not the minimum, because if the minimum is used an underestimation the IMT of those agent pairs on which no "minimum agent" participates would occur.

Therefore, $$\text{Avg\_subnet\_pair\_IMT}=2*(N/Z)^2*C/R$$

and given that $C=Z^2$:

$$\text{Avg\_subnet\_pair\_IMT}=2*N^2/R$$

Knowing the site pair, agent pair and subnet pair IMTs is important because they directly determine the amount of time to detect a performance degradation event. For example, if X consecutive test losses are required to flag a performance degradation, the amount of time required to reach that decision is X*IMT.

6. Path IMT

Note that the agent pair IMT is equivalent to the path IMT, i.e., information about the path between two agents (and hence the edges they are fowled with), can be refreshed every time the agent pair which communication goes over that path, is selected.

Therefore:

$$\text{Avg\_path\_IMT}=2*(N/Z)^2C/R$$

Path IMT is relevant to know how up to update a topology. For example, it may be advantageous to bound the path IMT to ensure the accuracy of the path information, which can be critical if, for example, specific edges are the culprit for the cause of performance degradation. Therefore, a constraint on path IMT can be:

$$\text{Avg\_path\_IMT}<\text{max\_path\_IMT\_allowed}$$

and from that, the minimum rate necessary to meet the constraint is:

$$R>2*(NZ)^2*C/\text{max\_path\_IMT\_allowed}$$

7. Multiple Test Types and Joint Rates

In order to support multiple test types at the same time and determine achievable rates for each test type, the above formulas can be used as long as an "effective test duration" can be determined. That is, each type of test can have a different test duration, and the fraction of which ones would last a given duration would depend on the ratio between the rates for each test type.

The rest of the section is going to be based on an example with two tests, RTP and ping.

If the ratio between the tests is known, the effective duration time is:

$$T\text{eff}=T\text{rtp}*P+T\text{ping}*(1-P)$$

where P is the fraction of tests that are RTP.

Based on the duration, a recommended rate Reff can be determined as usual. Then, the rates per test become:

$$R\text{rtp}=R\text{eff}*P$$

$$R\text{ping}=R\text{eff}*(1-P)$$

The user needs to specify P, or the configurator tool can suggest a value. If a user only desires one test, the user can define P as 0 or 1, depending on the desired test.

As discussed, the various agents 110, associated with a corresponding remote site, are able to perform a number of different types of tests, with RTP and ping being illustrated as exemplary tests above—with in general any type of test being able to be used in conjunction with the techniques of this invention. The running of one or more tests at the various agents are handled by the scheduler 220 in conjunction with the agent selector 230 and site selector 240.

The rate determination module 250, in conjunction with the test duration module 210 determine the rate and IMTs of the one or more tests running on the one or more agents associated with the one or more sites. For example, the rate determination module can determine the rate based on determining the type of site hierarchy, determining the number of site pairs, determining the smallest number of agents in any site, determining a test duration, determining a number of different tests, determining the maximum expected recommended rates and determining the expected IMTs (agent pair, subnet pair, path), and the like.

In operation, the rate determination module 250, determines the maximum absolute rate as discussed above. Then, the test duration module 210 determines the test duration based on one or more of the number of packets in a test, the interval between test packets, packet loss, average delay and rate limited agent(s). With the rate and test duration information, the rate determination module 250 determines a maximum optimal rate.

Then, the scheduler 220, first schedules tests at two levels. At the first level, the scheduler 220, in conjunction with the site selector 240, selects the pair of sites to test, and at a second level, the scheduler 220, in conjunction with the agent selector 230, selects the agent pair that is going to carry the test, with one agent pertaining to one site, and the other agent associated with the other site. An agent can be selected as either a master or slave, i.e., to originate test, or to receive the test, respectively, and depending if the agent is multi-threaded or not, i.e., if they can carry more than one test at a time, this rate can be adjusted. Next, the IMT is established noting that the agent pair IMT is equivalent to the path IMT, i.e., information about the path between the two agents can be refreshed every time the agent pair for which communication goes over that path is selected.

With the establishment of this information, testing between the one or more agents can commence in conjunction with or in accordance with the schedule established by the scheduler 220.

Figure 2:
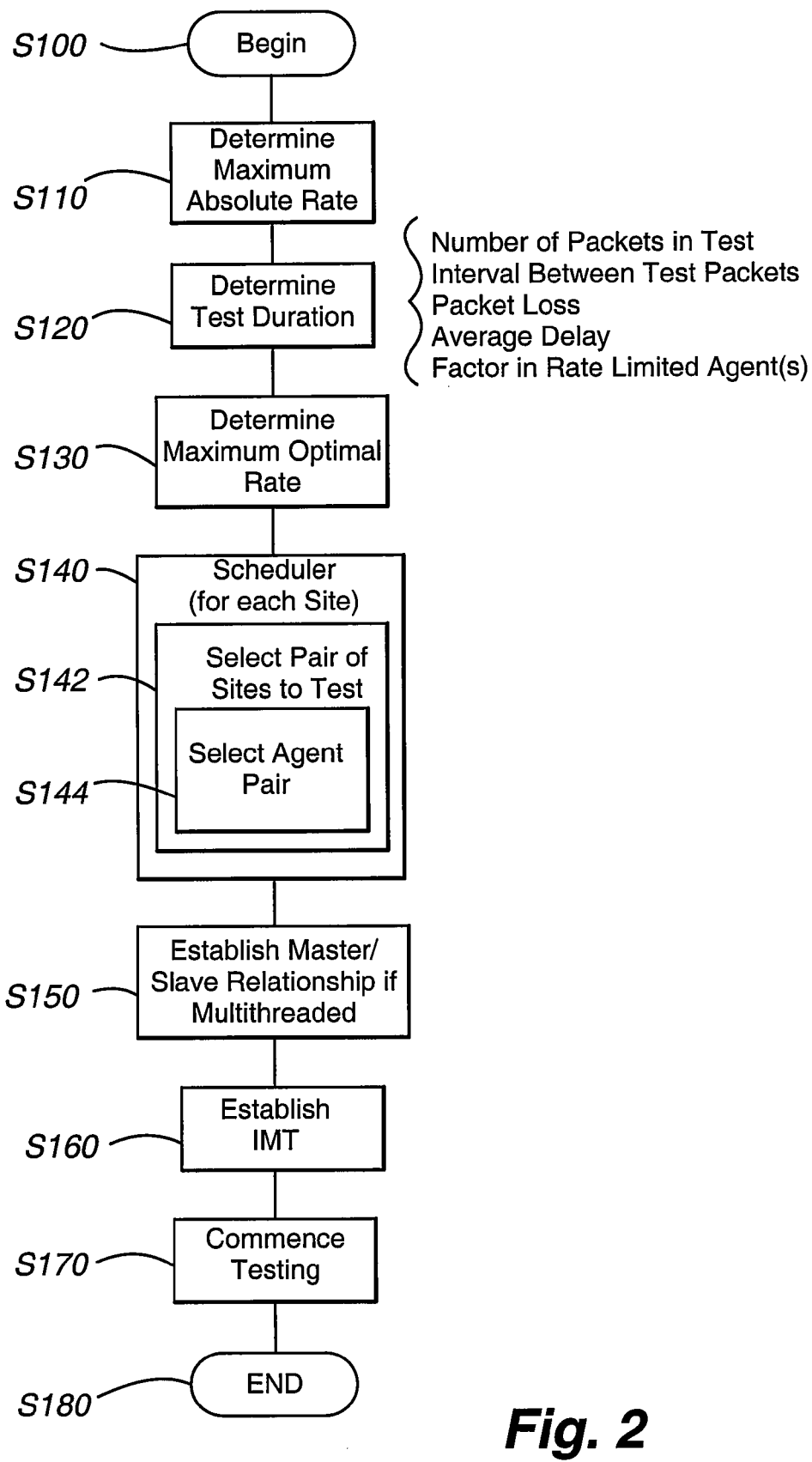
FIG. 2 outlines an exemplary method for determining a test interval according to this invention.

FIG. 2 outlines an exemplary method for determining a measurement rate between sites and between agents and scheduling of the testing. In particular, control begins in step S100 and continues to step S110. In step S110, the maximum absolute rate is determined. Next, in step S120, the test duration is determined based on one or more of the number of packets in a test, the interval between test packets, packet loss, average delay, rate limited agent(s) considerations, or, in general, any metric associated with agent or communication channel conditions. Then, in step S130, the maximum optimal rate is determined. Control then continues to step S140.

In step S140, and for each agent pair selected in step S144 and for each scheduled pair of sites to test in step S142*m*, the test is scheduled in step S140. Next, in step S150, the master/slave relationship or multi-threaded relationships are established. Then, in step S160, the IMT is established. Control then continues to step S170 with the commencement of the test(s) in accordance with the scheduled testing calendar with control continuing to step S180 where the control sequence ends.

Figure 3:
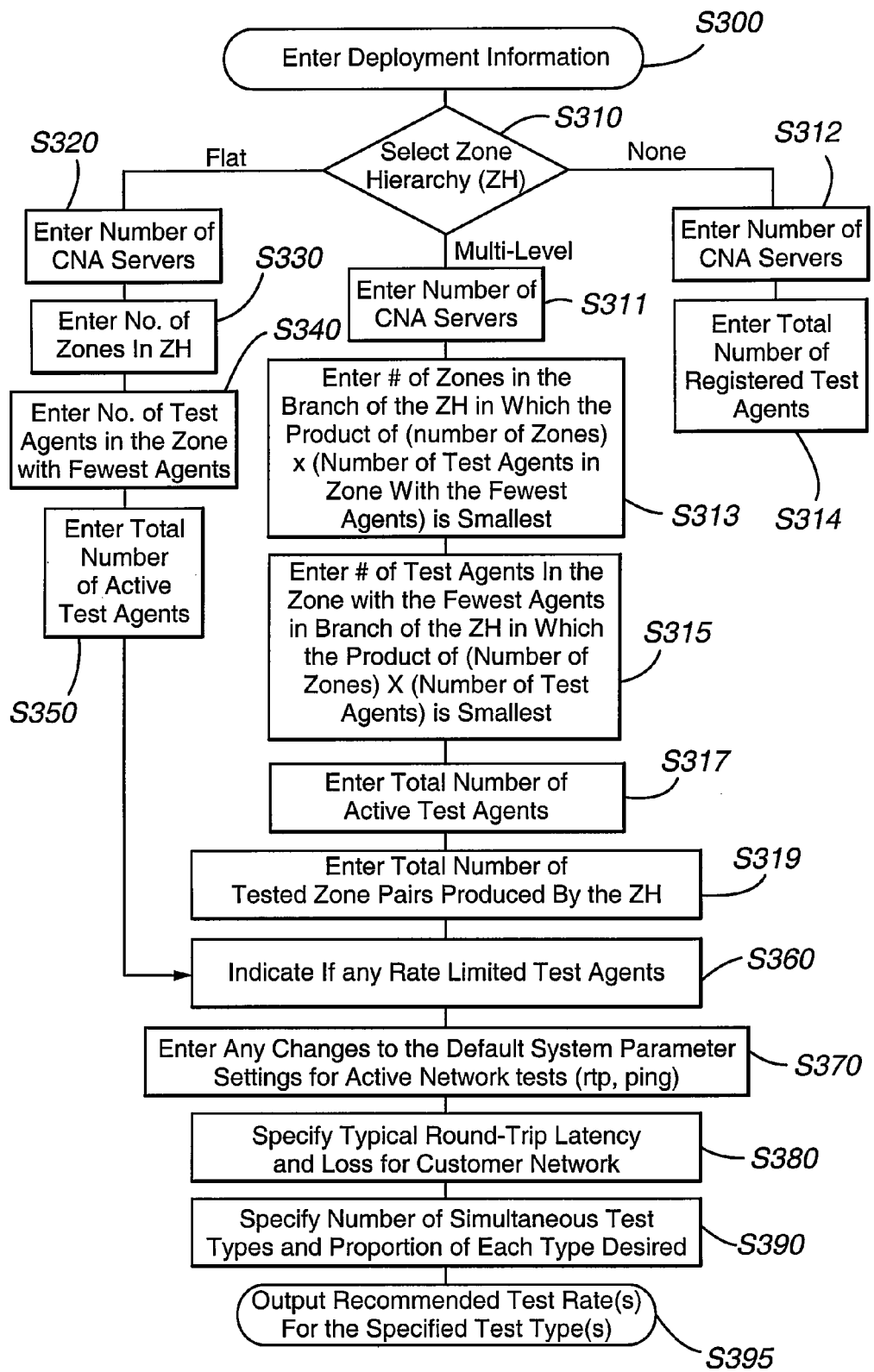
FIG. 3 is a flowchart outlining an exemplary method of utilizing a distributed measurement system configurator tool according to this invention.
Figure 4:
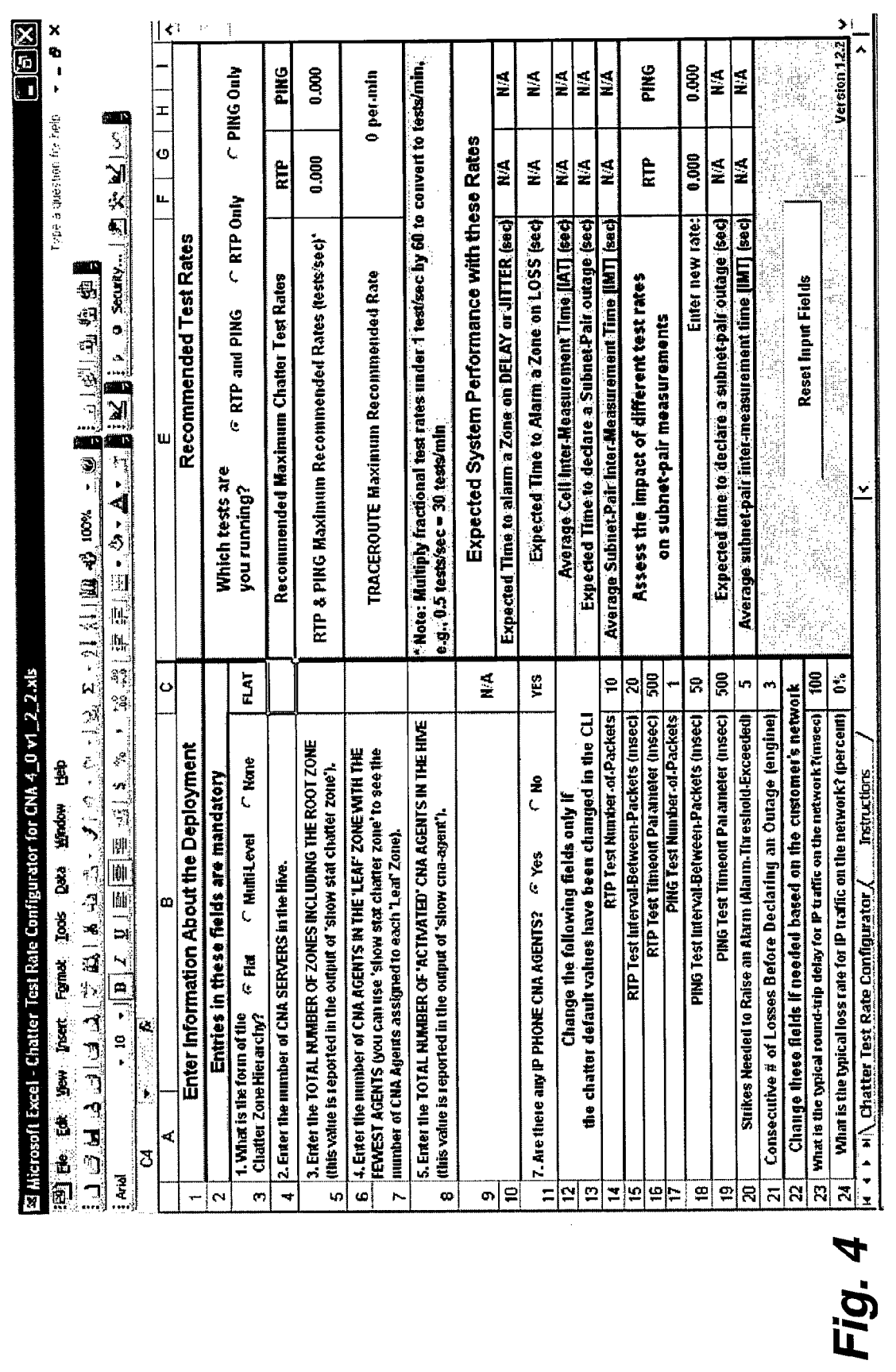

FIG. 3 outlines an exemplary method for utilizing an exemplary distributed measurement configuration tool, as illustrated in FIG. 4, according to this invention. In particular, control begins in step S300 and continues to step S310. In step S310, a zone hierarchy (ZH) is selected. If the zone hierarchy is flat, control continues to step S320. If the zone hierarchy is multi-leveled, control continues to step S311. If there is no zone hierarchy, control continues to step S312.

In step S320, for a flat ZH, the number of converged network analyzer servers is entered. Next, in step S330, the number of zones in the zone hierarchy is entered. Then, in step S340, the number of test agents in the zone with the fewest agents is entered. Control then continues to step S350 where the total number of active test agents is entered. Control then continues to step S360.

If the network is a multi-level ZH, in step S311, the number of converged network analyzer servers is entered. Next, in step S313, the number of zones in the branch with the smallest product between the agents in the zone with the fewest agents and the number of subzones of the zone hierarchy is entered. Then, in step S315, the number of test agents in the zone with the fewest agents of the branch of the zone hierarchy is entered. Control then continues to step S317.

In step S317, the total number of active test agents is entered. Next, in step S319, the total number of tested zone pairs produced by the zone hierarchy is entered with control continuing to step S360.

In step 312, for no ZH, the number of converged network analyzer servers is entered. Then, in step S314, the total number of registered test agents is entered with control jumping to step S360.

In step S360, the number of rate limited test agents is entered, if any. Then, at step S370, the user is given an opportunity to change the default system parameter settings for active network tests. Next, in step S380, typical round-trip latency and loss numbers for the customer network are specified. Then, in step S390, the number of simultaneous test types and proportion of each type desired is specified. Control then continues to step S395 where recommended test rate(s) for each of the specified test type(s) are output.

FIG. 4 illustrates an exemplary user interface that allows a user to manage various settings and input information as discussed in relation to FIG. 3. Depending on the network architecture or other factors, the various settings and parameters presented in user interface can be changed as appropriate.

FIGS. 5-6 illustrate some of the exemplary backend processes that the exemplary configuration tool utilizes to assist with determining rate and type information. In these figures, the rows with a light blue background 510 capture the formulas presented above, while the rows with a light yellow background 520 capture information entered by the user about the deployed distributed measurement system and the network being monitored. The two rows with a dark blue background 530 represent parameters whose values can be adjusted by the designer of the configuration tool as needed to capture changes in the performance and capabilities of the test agents and host devices.

FIG. 7 illustrates an exemplary populated configuration tool based on exemplary values entered by a user. For this particular exemplary embodiment, both RTP and ping tests are running with the system outputting the recommended chatter test rates, the expected system performance with these rates and the assessment of the impact of different test rates on subnet-pair measurements.

Figure 8:
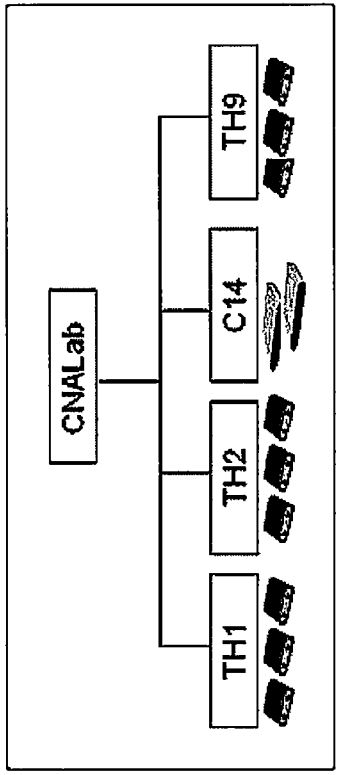
FIGS. 8-10 illustrate exemplary instruction sets that can be included with the tool according to this invention.
Figure 9:
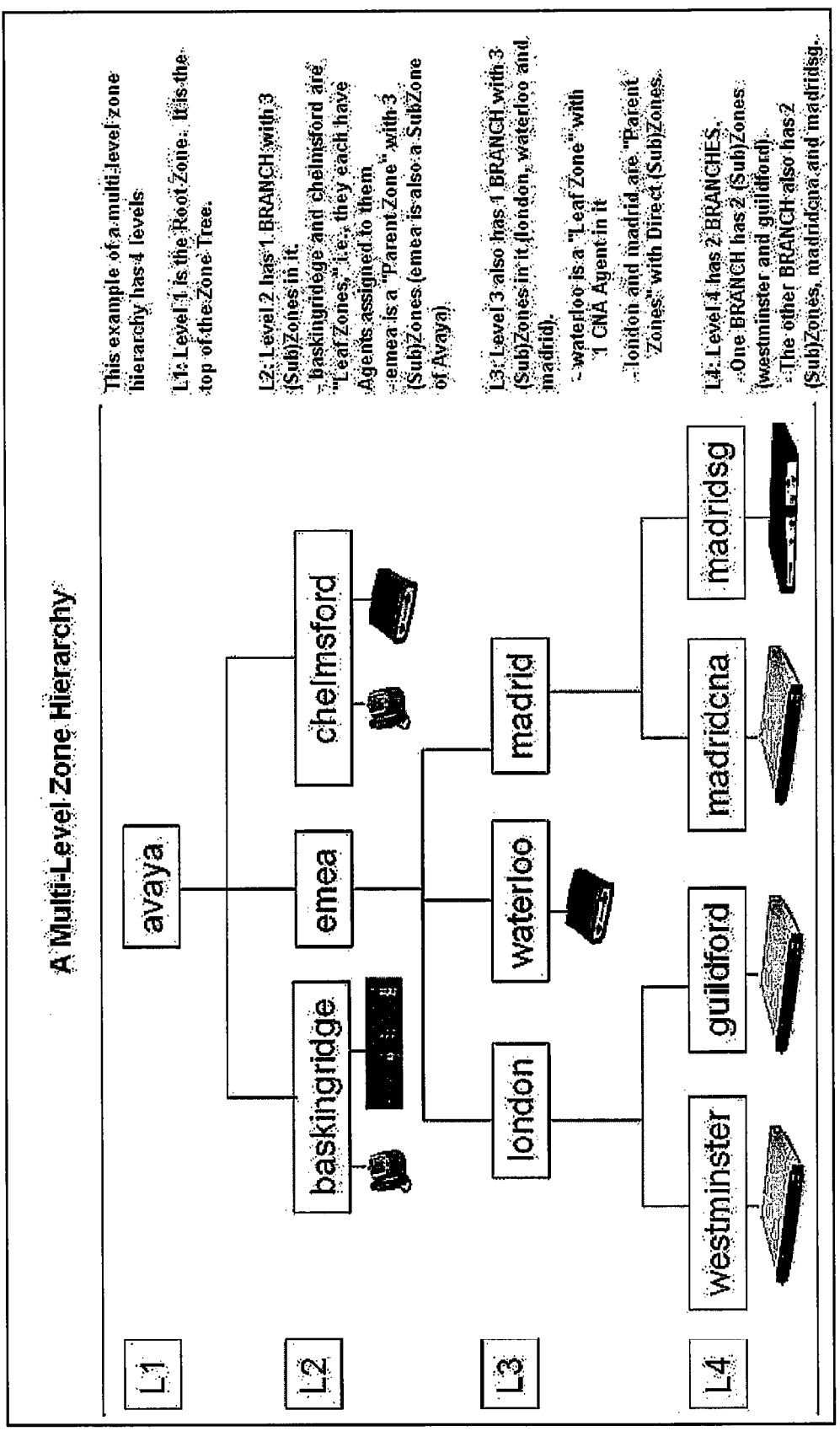
Figure 10:
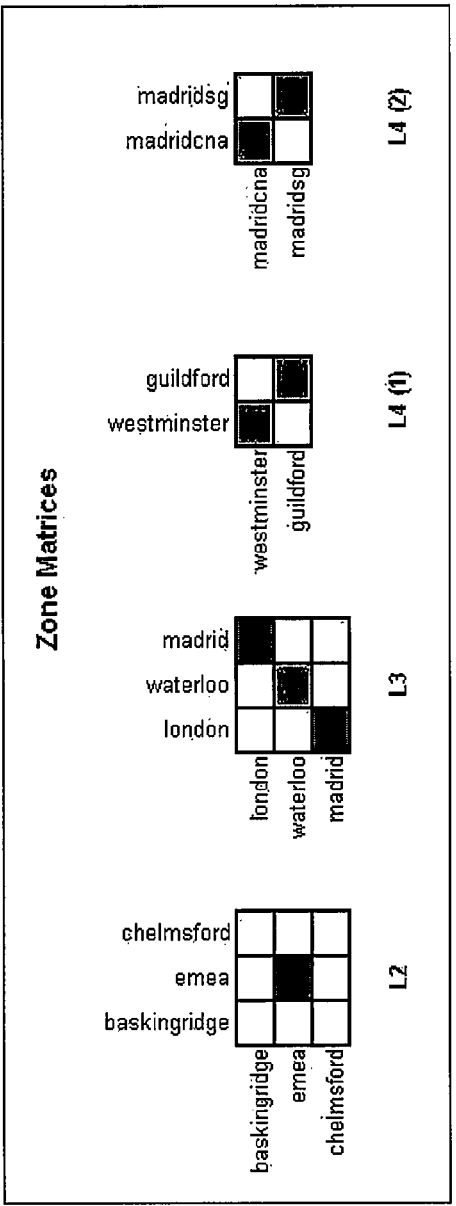

FIGS. 8-10 illustrate exemplary instructions that can be associated with a configuration tool and that provide various definitions, guidance and information relating to how a user should populate the various fields in the configuration tool. In particular, FIG. 8 illustrates an exemplary flat zone (site) hierarchy and provides an exemplary zone (site) matrix for a user.

FIG. 9 illustrates a multi-level zone hierarchy with guidance provided as to how the various levels and branches and sub-zones (sites) are configured.

FIG. 10 illustrates an exemplary multi-level tree with instructions on how to determine the branch with the fewest zones (sites). It is noted that in this exemplary instruction set, a sub-zone can be either a parent zone or a leaf zone (site), however, it cannot be both.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such as a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as telecom test device, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present invention, systems and methods for establishing test and measurement criteria. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A configuration system for a plurality of agents collectively implementing a distributed measurement system, wherein the plurality of agents are organized into a plurality of sites, comprising:
   a rate determination module that, with a microprocessor, determines a maximum test rate; and
   a test duration module that determines a test duration,
   wherein the rate determination module further determines a maximum achievable or optimal test rate that allows for detection of performance degradation over one or more communication paths, where the maximum achievable or optimal test rate can be expressed according to the formula:

$$R < Ni * C/Z * 1/\text{test\_duration}$$

where R is the maximum achievable or optimal test rate, C is the total number of site pairs, Z is the total number of sites, Ni is the number of agents in the site with the fewest agents, and test_duration is the duration of the test.

2. The system of claim 1, further comprising an agent selection module configured to select one or more agents at one or more sites.

3. The system of claim 1, where an initiating agent can support at least one test at a time.

4. The system of claim 1, further comprising a scheduling module adapted to schedule one or more tests based at least on information from the rate determination module.

5. The system of claim 4, where a scheduling module implements a fair scheduling algorithm.

6. The system of claim 5, where an average agent pair Inter-Measurement Time (IMT) can be expressed according to the formula:

$$\text{average\_pair\_IMT} = 2 * Mi * Mj * C/R$$

where Mi and Mj are the number of agents in each of the sites of the site pair, respectively, R is the maximum optimal test rate and C is the total number of site pairs.

7. The system of claim 5, where an average site pair Inter-Measurement Time (IMT) can be expressed according to the formula:

$$\text{site\_pair\_IMT} = C/R$$

where R is the maximum optimal test rate and C is the total number of site pairs.

8. The system of claim 1, wherein:
   the test duration is based on one or more of a number of packets in a test, interval between test packets and packet size;

tests are used to measure network parameters including one or more of round trip time, jitter and network loss; and the tests can be one or more of tests that use Real-time Protocol (RTP) and tests that use Internet Control Message Protocol (ICMP).

9. The system of claim 1, wherein:

testing commences based on the maximum optimal test rate; and tests of different types can occur simultaneously.

10. The system of claim 1, further comprising a user interface adapted to receive configuration information to assist with the maximum optimal test rate determination.

11. The system of claim 1, wherein the configuration information includes one or more of zone hierarchy information, distributed network server information, zone information, branch information, default system parameter information, round-trip latency and loss information, test type information and number of each test type.

12. The system of claim 1, wherein a distributed network analysis module outputs a recommended test rate(s) for one or more specified test types.

13. The system of claim 1, wherein the rate determination module determines an aggregate rate, which is a rate value at which the distributed measurement system is scheduling tests.

14. A configuration method for a plurality of agents collectively implementing a distributed measurement system, wherein the plurality of agents are organized into a plurality of sites, comprising:

determining a maximum test rate;

determining a test duration; and determining, using a microprocessor, a maximum achievable or optimal test rate that allows for detection of performance degradation over one or more communication paths, where the maximum achievable or optimal test rate can be expressed according to the formula:

$$R < Ni * C/Z * 1/\text{test\_duration}$$

where R is the maximum achievable or optimal test rate, C is the total number of site pairs, Z is the total number of sites, Ni is the number of agents in the site with the fewest agents, and test_duration is the duration of the test.

15. The method of claim 14, further comprising selecting one or more agents at one or more sites.

16. The method of claim 14, where an initiating agent can support at least one test at a time.

17. The method of claim 14, wherein a fair scheduling algorithm is used for scheduling tests.

18. The method of claim 17, where an average agent pair Inter-Measurement Time (IMT) can be expressed according to the formula:

$$\text{average\_pair\_IMT} = 2 * Mi * Mj * C/R$$

where Mi and Mj are the number of agents in each of the sites of the site pair, respectively, R is the maximum optimal test rate and C is the total number of site pairs.

19. The method of claim 17, where an average site pair Inter-Measurement Time (IMT) can be expressed according to the formula:

$$\text{site\_pair\_IMT} = C/R$$

where R is the maximum optimal test rate and C is the total number of site pairs.

20. The method of claim 14, wherein:

the test duration is based on one or more of a number of packets in a test, interval between test packets and packet size;

tests are used to measure network parameters including one or more of round trip time, jitter and network loss; and the tests can be one or more of tests that use Real-time Protocol (RTP) and tests that use Internet Control Message protocol (ICMP).

21. The method of claim 14, wherein configuration information for the distributed measurement system includes one or more of zone hierarchy information, distributed network server information, zone information, branch information, default system parameter information, round-trip latency and loss information, test type information and number of each test type.

22. The method of claim 14, further comprising determining an aggregate rate, which is a rate value at which the distributed measurement system is scheduling tests.

23. A test tool, in a distributed network environment, comprising:

a rate determination module adapted to dynamically determine with a microprocessor a test measurement rate over a number of paths in the distributed network, the test measurement rate designed to increase the ability to detect problems in the distributed network while not overwhelming a set of active test agents, wherein the test measurement rate can be expressed according to the formula:

$$R < Ni * C/Z * 1/\text{test\_duration}$$

where R is a maximum test measurement rate, C is the total number of site pairs, Z is the total number of sites, Ni is the number of agents in the site with the fewest agents, and test_duration is the duration of the test.

* * * * *